US007886357B2

(12) United States Patent
Rowland et al.

(10) Patent No.: US 7,886,357 B2
(45) Date of Patent: Feb. 8, 2011

(54) METHOD AND SYSTEM FOR REDUCING THE FALSE ALARM RATE OF NETWORK INTRUSION DETECTION SYSTEMS

(75) Inventors: Craig H. Rowland, Austin, TX (US); Aaron L. Rhodes, Arlington, VA (US)

(73) Assignee: Cisco Technology, Inc., San Jose, CA (US)

( * ) Notice: Subject to any disclaimer, the term of this patent is extended or adjusted under 35 U.S.C. 154(b) by 1275 days.

(21) Appl. No.: 10/402,649

(22) Filed: Mar. 28, 2003

(65) Prior Publication Data

US 2003/0212910 A1 Nov. 13, 2003

Related U.S. Application Data

(60) Provisional application No. 60/319,159, filed on Mar. 29, 2002.

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. ...................................... 726/23
(58) Field of Classification Search ............ 726/22, 726/23; 713/224
See application file for complete search history.

(56) References Cited

U.S. PATENT DOCUMENTS

| 5,727,152 A * | 3/1998 | Coolegem et al. ......... 709/215 |
|---|---|---|
| 5,919,257 A | 7/1999 | Trostle |
| 5,961,644 A | 10/1999 | Kurtzberg et al. ......... 713/200 |
| 5,991,881 A | 11/1999 | Conklin et al. ............ 713/201 |
| 6,070,244 A | 5/2000 | Orchier et al. ............ 713/201 |
| 6,134,664 A * | 10/2000 | Walker ..................... 726/22 |
| 6,148,407 A * | 11/2000 | Aucsmith ................. 726/16 |
| 6,182,223 B1 | 1/2001 | Rawson |
| 6,275,942 B1 | 8/2001 | Bernhard et al. ......... 713/201 |

(Continued)

FOREIGN PATENT DOCUMENTS

AU     2003243253 B2    4/2010

(Continued)

OTHER PUBLICATIONS

PCT Notification of Transmittal of the International Search Report or the Declaration, mailed Jul. 21, 2003, including International Search Report re PCT/US 03/09665 (6 pgs).

(Continued)

*Primary Examiner*—Kambiz Zand
*Assistant Examiner*—Jason K Gee
(74) *Attorney, Agent, or Firm*—Baker Botts L.L.P.

(57) ABSTRACT

According to one embodiment of the invention, a method for reducing the false alarm rate of network intrusion detection systems includes receiving an alarm indicating a network intrusion may have occurred, identifying characteristics of the alarm, including at least an attack type and a target address, querying a target host associated with the target address for an operating system fingerprint, receiving the operating system fingerprint that includes the operating system type from the target host, comparing the attack type to the operating system type, and indicating whether the target host is vulnerable to the attack based on the comparison.

12 Claims, 3 Drawing Sheets

U.S. PATENT DOCUMENTS

| | | | |
|---|---|---|---|
| 6,279,113 B1 | 8/2001 | Vaidya | |
| 6,282,546 B1 | 8/2001 | Gleichauf et al. | |
| 6,301,668 B1 | 10/2001 | Gleichauf et al. | 713/201 |
| 6,405,318 B1 | 6/2002 | Rowland | |
| 6,408,391 B1 | 6/2002 | Huff et al. | |
| 6,415,321 B1 | 7/2002 | Gleichauf et al. | |
| 6,460,141 B1 | 10/2002 | Olden | |
| 6,477,651 B1 | 11/2002 | Teal | |
| 6,513,122 B1 | 1/2003 | Magdych et al. | |
| 6,647,400 B1 | 11/2003 | Moran | 707/205 |
| 6,714,513 B1 | 3/2004 | Joiner et al. | 370/224 |
| 6,725,377 B1 | 4/2004 | Kouznetsov | 713/201 |
| 6,785,821 B1 | 8/2004 | Teal | 713/201 |
| 6,839,850 B1 | 1/2005 | Campbell et al. | 713/201 |
| 6,941,467 B2 | 9/2005 | Judge et al. | 713/200 |
| 6,950,845 B2 | 9/2005 | Givoly | 709/200 |
| 6,957,348 B1* | 10/2005 | Flowers et al. | 713/150 |
| 6,990,591 B1 | 1/2006 | Pearson | 713/201 |
| 7,058,968 B2 | 6/2006 | Rowland et al. | 726/1 |
| 7,073,198 B1 | 7/2006 | Flowers et al. | 726/25 |
| 7,152,105 B2 | 12/2006 | McClure et al. | 709/224 |
| 7,162,649 B1 | 1/2007 | Ide et al. | 713/201 |
| 7,197,762 B2 | 3/2007 | Tarquini | 726/3 |
| 7,200,866 B2 | 4/2007 | Kim et al. | 726/23 |
| 7,237,264 B1* | 6/2007 | Graham et al. | 726/23 |
| 7,444,679 B2 | 10/2008 | Tarquini et al. | 726/25 |
| 2002/0052876 A1 | 5/2002 | Waters | 707/100 |
| 2002/0087882 A1* | 7/2002 | Schneier et al. | 713/201 |
| 2003/0056116 A1 | 3/2003 | Bunker et al. | 713/201 |
| 2003/0196123 A1 | 10/2003 | Rowland et al. | |

FOREIGN PATENT DOCUMENTS

| | | |
|---|---|---|
| CA | 2 484 461 A1 | 11/2003 |
| CN | ZL038103931 | 10/2008 |
| EP | 985 995 A1 | 3/2000 |
| EP | 1 504 323 B1 | 12/2009 |
| WO | WO 99/57625 | 11/1999 |
| WO | WO 00/54458 | 9/2000 |
| WO | WO 00/70464 | 11/2000 |
| WO | WO 01/84270 A2 | 11/2001 |
| WO | WO 02/19077 A2 | 3/2002 |
| WO | WO 03/084181 | 10/2003 |
| WO | 2003098413 | 11/2003 |
| WO | WO 2005/109824 | 11/2005 |
| WO | WO 2006/0082380 | 8/2006 |
| WO | WO 2007/122495 | 11/2007 |

OTHER PUBLICATIONS

PCT Notification of Transmittal of the International Search Report or the Declaration, mailed Sep. 16, 2003, including International Search Report re PCT/US 03/15546 (7 pgs).

PCT Notification of Transmittal of The International Search Report and the Written Opinion of the International Searching authority, or the Declaration; Int'l Application No. PCT/US04/32976; Int'l filing date: Oct. 6, 2004; Applicant: Cisco Technology, Inc.; 12 pages, Nov. 21, 2005.

Guy G. Helmer, et al.; "*Intelligent Agents for Intrusion Detection;*" IEEE; pp. 121-124, 1998.

Ellen Messmer, "Network Intruders," Network World, pp. 67-68, Oct. 4, 1999.

Dennis Hollingworth, et al., "Enhancing Operating System Resistance to Information Warfare," IEEE, pp. 1037-1041, 2000.

U.S. Appl. No. 10/685,726, filed Oct. 15, 2003 by inventor Craig H. Rowland, "Method and System for Reducing the False Alarm Rate of Network Intrusion Detection Systems".

*Know Your Enemy: Passive Fingerprinting, Identifying remote hosts, without them knowing*, Honeynet Project, http://project.honeynet.org, Last Modified: Mar. 4, 2002 (4 pages).

Toby Miller, *Passive OS Fingerprinting: Details and Techniques*, http://www.incidents.org/papers/OSfingerprinting.php, © SANS Institute 2003.

Rowland, et al., U.S. Appl. No. 10/439,030, filed May 14, 2003, *Method and System for Analyzing and Addressing Alarms from Network Intrusion Detection Systems*, Rowland, et al.

C. H. Rowland, U.S. Appl. No. 10/685,726, filed Oct. 15, 2003, *Method and System for Reducing the False Alarm Rate of Network Intrusion Detection Systems*.

Rowland, et al., U.S. Appl. No. 60/319,242, filed May 14, 2002, *A System and Method for Actively Reducing the False Alarm Rate of Network Intrusion Detection Systems*.

*Know Your Enemy: Passive Fingerprinting, Identifying remote hosts, without them knowing*, Honeynet Project, http://project.honeynet.org, Last Modified: Mar. 4, 2002 (4 pages).

Toby Miller, *Passive OS Fingerprinting: Details and Techniques*, http://www.incidents.org/papers/OSfingerprinting.php, © SANS Institute 2003.

"Keep Attackers at Bay", Andrew Conry-Murry; *Information Week*; 1046; ABI/Inform Global; p. 45, Jul. 4, 2005.

"Building a True Anomaly Detector for Intrusion Detection", Susan C. Lee and David V. Heinbuch; The Johns Hopkins University Applied Physics Laboratory, Laurel, MD 20723, 2000.

"Intrusion Detection in Sensor Networks: A Non-cooperative Game Approach", Agah et al.; Department of Computer Science and Engineering; University of Texas at Arlington, Arlington, TX 76019-0015, 2004.

"Enhancing Operating System Resistance to Information Warfare", Dennis Hollingworth and Timothy Redmond; NAI Labs at Network Associates, Los Angeles, California, 2000.

Office Action issued by the Canadian Intellectual Property Office; Application No. 2,479,504; Title: Method and System for Reducing the False Alarm Rate of Network Intrusion Detection Systems, Nov. 24, 2008.

Office Action from the Canadian Intellectual Property Office; Application No. 2,484,461, Jan. 7, 2009.

Office Action from the State Intellectual Property Office of the People's Republic of China; Application No. 03807319.6, Dec. 30, 2008.

Australian Government Examiner's First Report on patent application No. 2008229835, Apr. 2, 2009.

Second Office Action issued by the Patent Office of the People's Republic of China; Applicant: Cisco Technology, Inc.; Application No. 03807319.6, Jul. 10, 2009.

U.S. Appl. No. 60/319,242 entitled "A System and Method for Actively Reducing the False Alarm Rate of Network Intrusion Detection Systems", May 14, 2002.

* cited by examiner

METHOD AND SYSTEM FOR REDUCING THE FALSE ALARM RATE OF NETWORK INTRUSION DETECTION SYSTEMS

RELATED APPLICATIONS

This application claims the benefit of Ser. No. 60/319,159, entitled "A System and Method for Reducing the False Alarm Rate of Network Intrusion Detection Systems," filed provisionally on Mar. 29, 2002.

TECHNICAL FIELD OF THE INVENTION

This invention relates generally to intrusion detection and more particularly to a method and system for reducing the false alarm rate of network intrusion detection systems.

BACKGROUND OF THE INVENTION

Network Intrusion Detection Systems ("NIDS") are typically designed to monitor network activity in real-time to spot suspicious or known malicious activity and to report these findings to the appropriate personnel. By keeping watch on all activity, NIDS have the potential to warn about computer intrusions relatively quickly and allow administrators time to protect or contain intrusions, or allow the NIDS to react and stop the attack automatically. In the security industry, a NIDS may either be a passive observer of the traffic or an active network component that reacts to block attacks in real-time.

Because NIDS are passive observers of the network traffic, they often lack certain knowledge of the attacking and defending host that makes it impossible to determine if an attack is successful or unsuccessful. Much like an eavesdropper overhearing a conversation between two strangers, NIDS very often lack knowledge of the context of the attack and, therefore, "alarm" on network activity that may not be hostile or relevant.

Some systems attempt to address this problem by building a static map of the network they are monitoring. This knowledge is usually built by scanning all the systems on the network and saving the result to a database for later retrieval. This system is inadequate for most networks because the topology, types, and locations of network devices constantly change and requires the administrator to maintain a static database. Additionally, the stress of constantly scanning and keeping the network databases up to date is very intensive and may often slow down or cause network services to stop functioning.

SUMMARY OF THE INVENTION

According to one embodiment of the invention, a method for reducing the false alarm rate of network intrusion detection systems includes receiving an alarm indicating a network intrusion may have occurred, identifying characteristics of the alarm, including at least an attack type and a target address, querying a target host associated with the target address for an operating system fingerprint, receiving the operating system fingerprint that includes the operating system type from the target host, comparing the attack type to the operating system type, and indicating whether the target host is vulnerable to the attack based on the comparison.

Some embodiments of the invention provide numerous technical advantages. Other embodiments may realize some, none, or all of these advantages. For example, according to one embodiment, the false alarm rate of network intrusion detection systems ("NIDS") is substantially reduced or eliminated, which leads to a lower requirement of personnel monitoring of NIDS to respond to every alarm. A lower false alarm rate is facilitated even though knowledge of the entire protected network is not required. Because knowledge of the network is not required, hosts may be dynamically added to the network. According to another embodiment, critical attacks on a network are escalated and costly intrusions are remediated.

Other advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which.

DETAILED DESCRIPTION OF EXAMPLE EMBODIMENTS OF THE INVENTION

Embodiments of the invention are best understood by referring to FIGS. 1 through 4 of the drawings, like numerals being used for like and corresponding parts of the various drawings.

Figure 1:
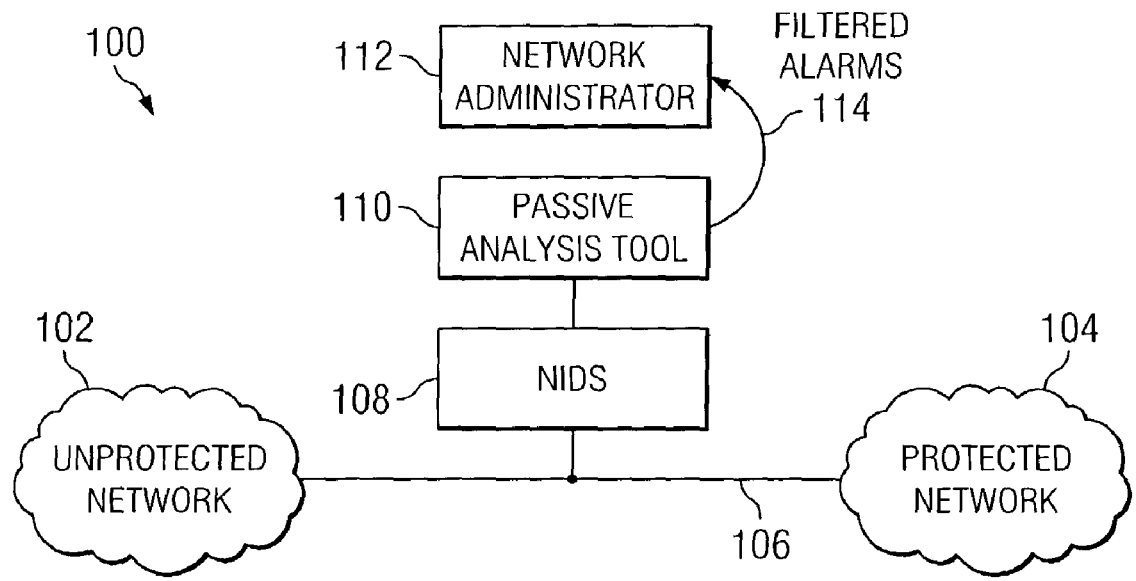
FIG. 1 is a schematic diagram illustrating a system for reducing the false alarm rate of network intrusion detection systems by utilizing a passive analysis tool according to one embodiment of the invention.

FIG. 1 is a schematic diagram illustrating a system 100 for reducing the false alarm rate of a network intrusion detection system ("NIDS") 108 by utilizing a passive analysis tool 110 in accordance with one embodiment of the present invention. In the illustrated embodiment, NIDS 108 is coupled to a link 106 that communicatively couples an unprotected network 102 with a protected network 104. System 100 also includes a network administrator 112 that utilizes passive analysis tool 110, as described in more detail below.

Unprotected network 102 may be any suitable network external to protected network 104. An example of unprotected network 102 is the Internet. Protected network 104 may be any suitable network, such as a local area network, wide area network, virtual private network, or any other suitable network desired to be secure from unprotected network 102. Link 106 couples unprotected network 102 to protected network 104 and may be any suitable communications link or channel. In one embodiment, communications link 106 is operable to transmit data in "packets" between unprotected network 102 and protected network 104; however, communications link 106 may be operable to transmit data in other suitable forms.

In one embodiment, NIDS 108 is any suitable network-based intrusion detection system operable to analyze data packets transmitted over communications link 106 in order to detect any potential attacks on protected network 104. NIDS 108 may be any suitable combination of hardware, firmware, and/or software. Typically, NIDS 108 includes one or more sensors having the ability to monitor any suitable type of network having any suitable data link protocol. In a particular embodiment, the sensors associated with NIDS 108 are operable to examine data packets on an IP ("Internet Protocol") network using any suitable protocol, such as TCP ("Transmission Controlled Protocol"), UDP ("User Datagram Protocol"), and ICMP ("Internet Controlled Message Protocol"). Upon detection of a possible attack on protected network 104, NIDS 108 is operable to generate an alarm indicating that an attack on protected network 104 may have occurred and may block the attack outright. This alarm is then transmitted to passive analysis tool 110 for analysis as described below.

According to the teachings of one embodiment of the present invention, passive analysis tool 110 receives an alarm from NIDS 108 and, using the information associated with the alarm, determines if an attack is real or a false alarm. Passive analysis tool 110 significantly lowers the false alarm rate for network intrusion detection systems, such as NIDS 108, in the network environment and lowers the requirement of personnel, such as network administrator 112, monitoring these systems to respond to every alarm. Details of passive analysis tool 110 are described in greater detail below in conjunction with FIGS. 2 through 4. Although illustrated in FIG. 1 as being separate from NIDS 108, passive analysis tool may be integral with NIDS 108 such that separate hardware is not required. In any event, NIDS 108 and passive analysis tool 110 work in conjunction with one another to analyze, reduce, or escalate alarms depending on the detected severity and accuracy of the attack. One technical advantage is that the invention may eliminate alarms targeted at the wrong operating system, vendor, application, or network hardware.

Network administrator 112 may be any suitable personnel that utilizes passive analysis tool 110 in order to monitor potential attacks on protected network 104 and respond thereto, if appropriate. Network administrator 112 typically has passive analysis tool 110 residing on his or her computer in order to receive filtered alarms from passive analysis tool, as denoted by reference numeral 114.

Figure 2:
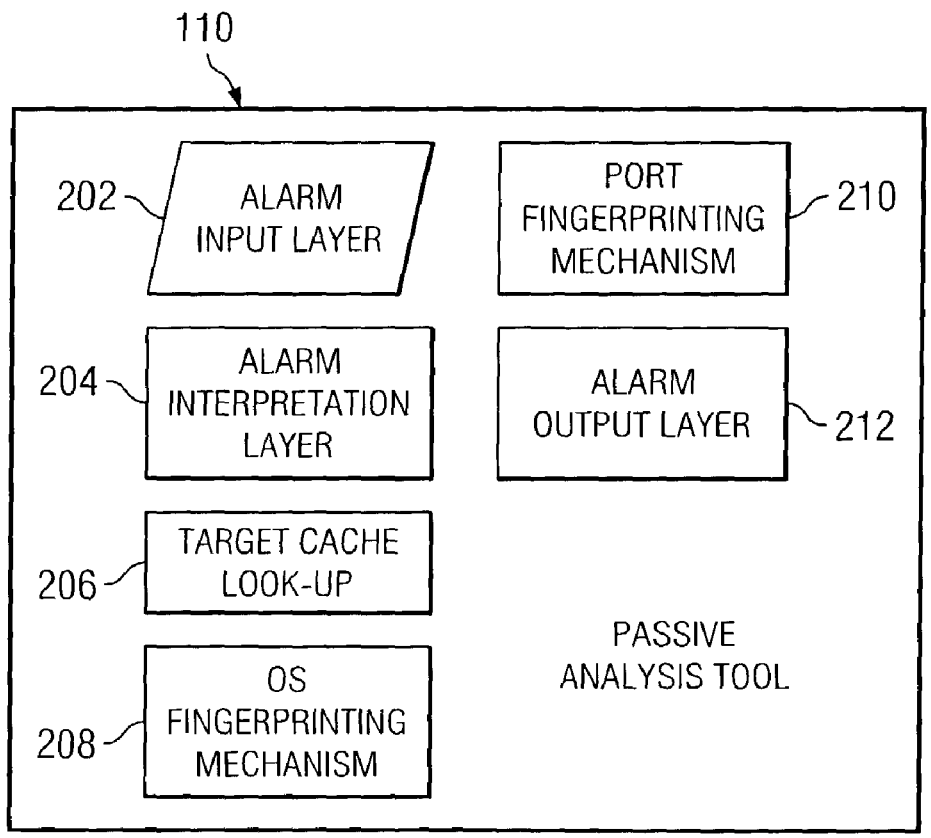
FIG. 2 is a block diagram illustrating various functional components of the passive analysis tool of FIG. 1 according to the one embodiment of the invention.

FIG. 2 is a block diagram illustrating various functional components of passive analysis tool 110 in accordance with one embodiment of the present invention. The present invention contemplates more, less, or different components than those shown in FIG. 2. In the illustrated embodiment, passive analysis tool 110 includes an alarm input layer 202, an alarm interpretation layer 204, a target cache look-up 206, an operating system ("OS") fingerprinting mechanism 208, a port fingerprinting mechanism 210 and an alarm output layer 212. The general functions of each of these components are now described before a more detailed description of the function of passive analysis tool 110 is undertaken in conjunction with FIGS. 3 and 4.

Alarm input layer 202 is generally responsible for accepting the alarm from NIDS 108 and passing it to other system components for analysis. In one embodiment, alarm input layer 202 accepts the alarm from NIDS 108 and determines if the alarm format is valid. If the alarm format is invalid, then the alarm is disregarded. If the alarm format is valid, then the alarm is sent to alarm interpretation layer 204. Alarm input layer 202 is preferably designed to be NIDS vendor independent so that it may accept alarms from multiple NIDS sources concurrently with no modification.

Generally, alarm interpretation layer 204 receives the alarm from alarm input layer 202 and performs an analysis on the alarm. In one embodiment, alarm interpretation layer 204 determines whether the alarm is from a supported NIDS vendor. If the alarm is not from a supported NIDS vendor, an alert is generated and the alarm is disregarded. If the alarm is from a supported NIDS vendor, then alarm interpretation layer 204 is responsible for determining the NIDS vendor alarm type, relevant operating system type being attacked (e.g., Microsoft Windows, Sun Solaris, Linux, UNIX, etc.), the source address, target network address, the alarm severity, the alarm description, and any other suitable parameters associated with the alarm. Some of this information is used by passive analysis 110 to test if the alarm is real or false, as described in more detail below in conjunction with FIGS. 3 and 4.

Target cache look-up 206 indicates that a look-up is performed by passive analysis tool 110 in order to determine if the target host has already been checked for the particular attack indicated by the alarm. The lookup may be performed in any suitable storage location, such as a local state table or database.

OS fingerprinting mechanism 208 performs a passive analysis of the target host to determine the operating system type of the target host. Briefly, in one embodiment, passive analysis tool 110 sends Internet Protocol ("IP") packets at the target host with special combinations of protocol flags, options, and other suitable information in the header in order to ascertain the operating system vendor and version number. Operating system fingerprinting is well known in the industry and, hence, is not described in detail herein. An advantage of this type of OS fingerprinting is that it requires no internal access to the target host other than remote network connectivity. OS fingerprinting mechanism 208 may build an operating system type within seconds of execution and stores this information in a suitable storage location for later retrieval and use.

Port fingerprinting mechanism 210 functions to identify a target port address stored in a suitable storage location when a host is added or deleted dynamically. Port fingerprinting mechanism 210 works in conjunction with OS fingerprinting mechanism 208 to determine, for example, if an attacked port on a target host is active or inactive. This allows passive analysis tool 110 to quickly determine an attack could work. For example, an attack against TCP port 80 on a target host may be proven to have failed by checking the target host to see if port 80 is active to begin with.

Alarm output layer 212 is responsible for taking the analyzed data from passive analysis tool 110 and either escalating or de-escalating the alarm. In other words, alarm output layer 212 functions to report a valid alarm; i.e., that a particular target host is vulnerable to an attack. A valid alarm may be reported in any suitable manner, such as a graphical user interface, a log file, storing in a database, or any other suitable output.

Additional description of the details of the functions of passive analysis tool 110, according to one embodiment of the invention, are described below in conjunction with FIGS. 3 and 4.

Figure 3:
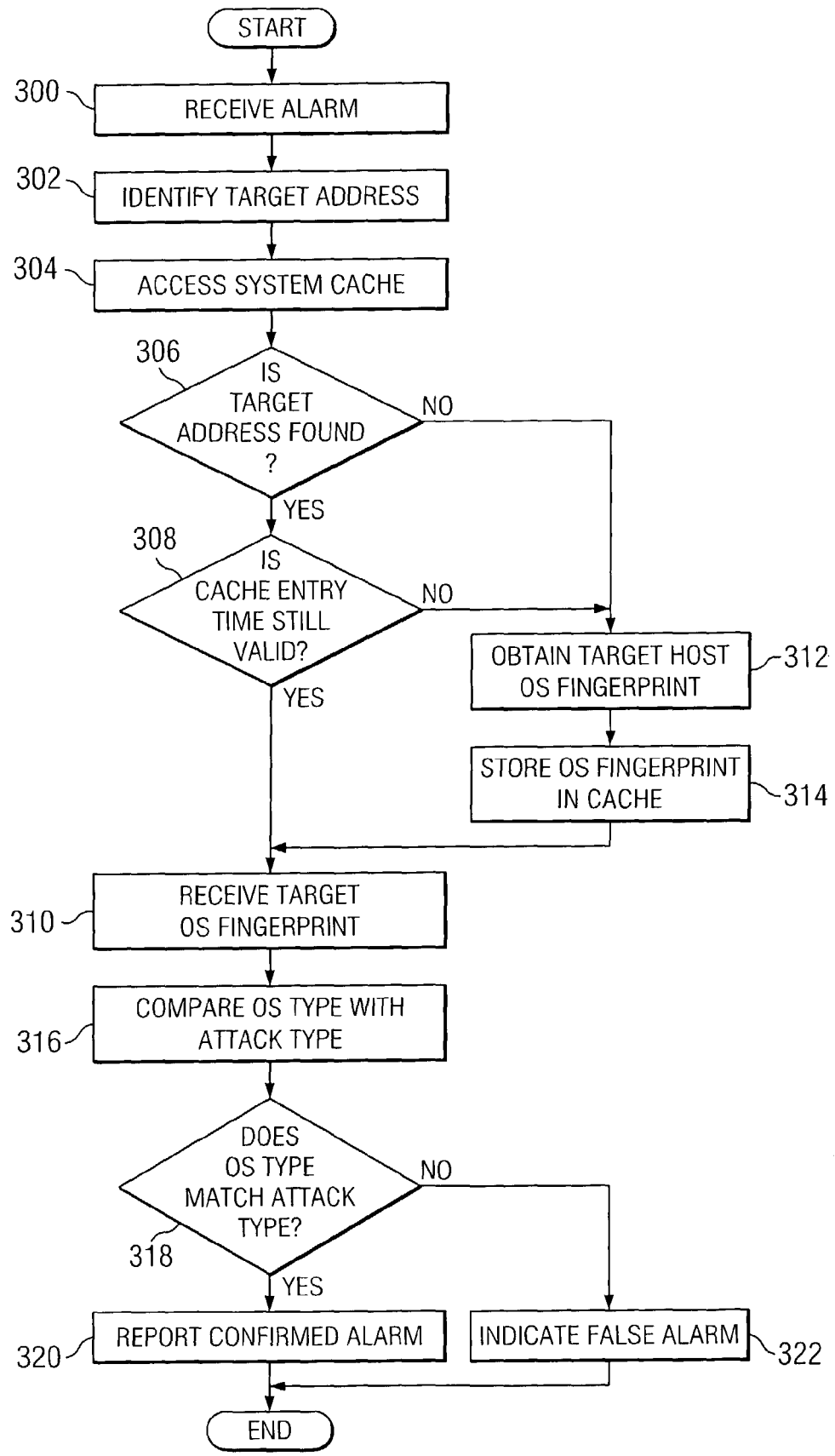
FIG. 3 is a flowchart illustrating a method for reducing the false alarm rate of network intrusion detection systems according to one embodiment of the invention.

FIG. 3 is a flow chart illustrating an example method for reducing the false alarm rate of network intrusion detection systems according to one embodiment of the present invention. The example method begins at step 300 where an alarm is received from NIDS 108 by passive analysis tool 110. Passive analysis tool 110 identifies the target address from the alarm at step 302. Passive analysis tool 110 then accesses a system cache at step 304 in order to determine if the identified target host has already been checked for that particular attack type.

Accordingly, at decisional step 306, it is determined whether the target address has been found in the system cache. If the target address is found, then at decisional step 308, it is determined whether the cache entry time is still valid. In other words, if a particular target host was checked for a particular type of attack within a recent time period, then this information is stored temporarily in the system cache. Although any suitable time period may be used to store this information, in one embodiment, the information is stored for no more than one hour. If the cache entry time is still valid, then the method continues at step 310 where the OS fingerprint of the target host is received by passive analysis tool 110.

Referring back to decisional steps 306 and 308, if the target address is not found in the system cache or if the cache entry time is invalid for a particular target address that is found in the system cache, then the operating system fingerprint of the target host is obtained by passive analysis tool 110 using any suitable OS fingerprinting technique, as denoted by step 312. The operating system fingerprint is then stored in the system cache at step 314. The method then continues at step 310 where the operating system fingerprint of the target host is received.

The attack type and the operating system type of the target host are compared at step 316 by passive analysis tool 110. At decisional step 318, it is determined whether the operating system type of the target host matches the attack type. If there is a match, then a confirmed alarm is reported by step 320. If there is no match, then a false alarm is indicated, as denoted by step 322. For example, if the attack type is for a Windows system and the operating system fingerprint shows a Windows host, then the alarm is confirmed. However, if the attack type is for a Windows system and the operating system fingerprint shows a UNIX host, then this indicates a false alarm. This then ends the example method outlined in FIG. 3.

Although the method outlined in FIG. 3 is described with reference to passive analysis tool 110 comparing an operating system type with an attack type, other suitable characteristics of the operating system may be compared to relevant characteristics of the attack type in order to determine if the alarm is real or false.

Thus, passive analysis tool 110 is intelligent filtering technology that screens out potential false alarms while not requiring knowledge of the entire protected network 104. Alarm inputs are received from a deployed NIDS, such as NIDS 108, and analyzed to determine if an attack is real or a false alarm. This is accomplished even though agents are not required to be installed on each computing device of the protected network 104.

Figure 4:
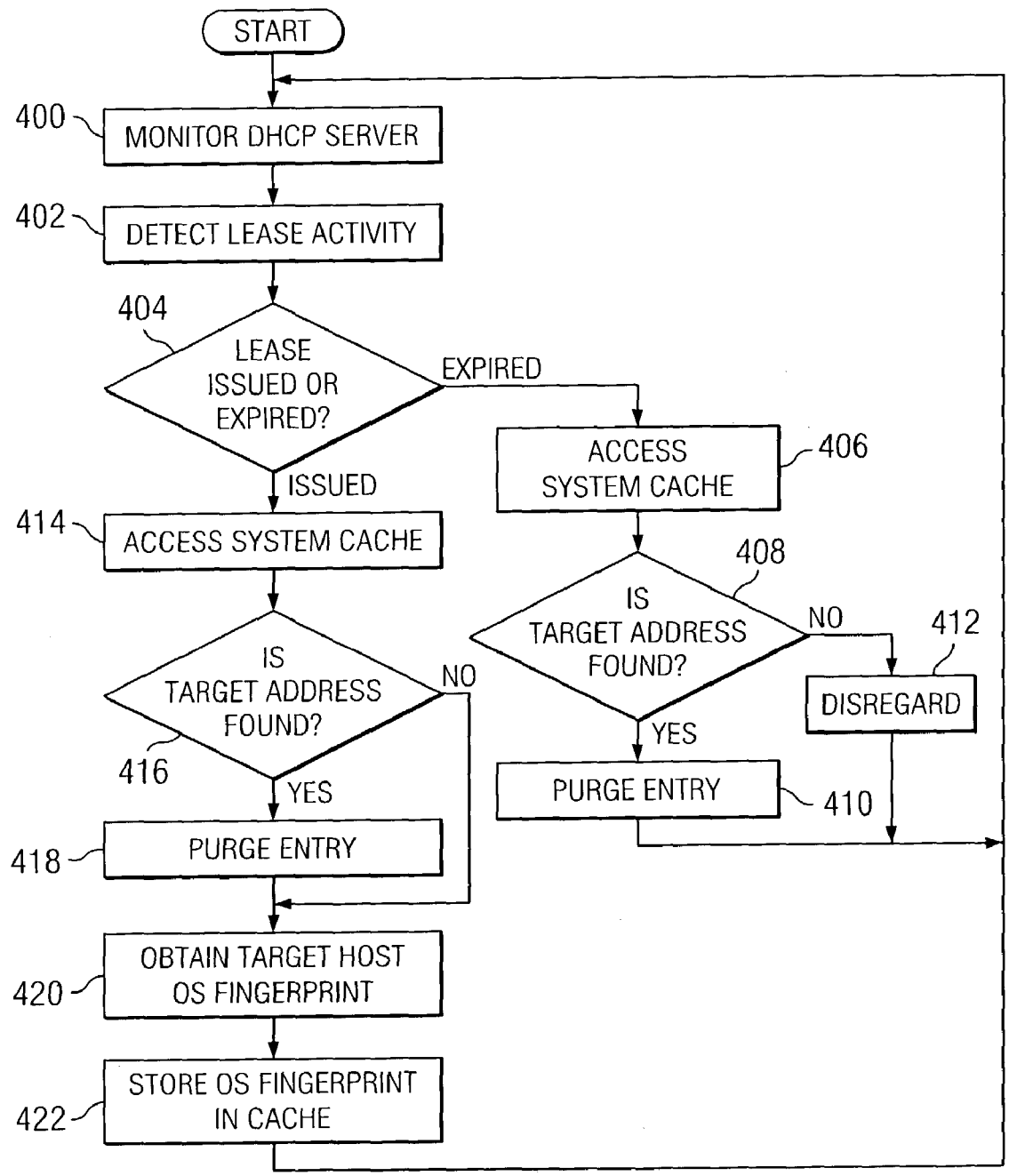
FIG. 4 is a flowchart illustrating a method that may be used in conjunction with the method of FIG. 3 according to one embodiment of the invention.

FIG. 4 is a flowchart illustrating an example method that may be used in conjunction with the example method outlined in FIG. 3 in accordance with an embodiment of the present invention. The example method in FIG. 4 begins at step 400 where a dynamic host configuration protocol ("DHCP") server is monitored by passive analysis tool 110. The present invention contemplates any suitable dynamic configuration protocol server being monitored by passive analysis tool 110. At step 402, lease activity is detected by passive analysis tool 110. At decisional step 404 it is determined whether a lease issue is detected or a lease expire is detected.

If a lease expire is detected by passive analysis tool 110, then the system cache is accessed, as denoted by step 406. At decisional step 408, it is determined whether the target address associated with the lease expire is found in the system cache. If the target address is found in the system cache, then the entry is purged, at step 410, from the system cache. Passive analysis tool 110 then continues to monitor the DHCP server. If a target address is not found in the system cache, then the lease expire is disregarded, as denoted by step 412. Passive analysis tool 110 continues to monitor the DHCP server.

Referring back to decisional step 404, if a lease issue has been detected, then the system cache is accessed, as denoted by step 414. At decisional step 416, it is determined whether the target address associated with the lease issue is found in the system cache. If the target address is found, then the entry is purged, at step 418. If the target address is not found in the system cache, then the method continues at step 420, as described below.

At step 420, the operating system fingerprint of a target host is obtained at step 420. The operating system fingerprint is stored in the system cache, as denoted by step 422 for a particular time period. Passive analysis tool 110 then continues to monitor DHCP server.

The method outlined in FIG. 4 address the dynamic addition of hosts to protected network 104 in order that prior knowledge of the network is not required. This saves considerable time and money and is more accurate than prior systems in which prior knowledge of the network is required. Passive analysis tool 110 may store entries for a user defined length of time that reduces the number of time operating system fingerprints need to be accomplished, which increases the efficiency of the network intrusion detection system. Another technical advantage is that resources are conserved and the impact on the protected network is low because target system profiles are built only when needed, effectively serving as a "just-in-time" vulnerability analysis.

Although the present invention is described with several example embodiments, various changes and modifications may be suggested to one skilled in the art. The present invention intends to encompass those changes and modifications as they fall within the scope of the claims.

What is claimed is:

1. A method for reducing the false alarm rate of network intrusion detection systems, comprising:

receiving an alarm indicating a network intrusion may have occurred;

identifying characteristics of the alarm, including at least an attack type, a source address, a target address, an alarm severity, and an alarm description;

accessing a storage location;

determining whether an operating system fingerprint for a target host associated with the target address already exists in the storage location;

if the operating system fingerprint for the target host does not exist, then:

querying the target host for the operating system fingerprint;

receiving the operating system fingerprint that includes the operating system type from the target host;

comparing the attack type to the operating system type; and indicating whether the target host is vulnerable to the attack based on the comparison;

if the operating system fingerprint for the target host does exist, then:

determining if a cache entry time for the target address is valid; and if the cache entry time is invalid, then:

querying the target host for the operating system fingerprint;

receiving the operating system fingerprint that includes the operating system type from the target host;

comparing the attack type to the operating system type; and indicating whether the target host is vulnerable to the attack based on the comparison;

if the cache entry time is valid, then:

comparing the attack type to the operating system type; and indicating whether the target host is vulnerable to the attack based on the comparison.

2. The method of claim 1, further comprising storing the operating system fingerprint of the target host in the storage location for a time period.

3. The method of claim , further comprising:
monitoring a dynamic configuration protocol server;
detecting that a lease issue has occurred for a new target host;
querying the new target host for a new operating system fingerprint;
receiving the new operating system fingerprint from the new target host; and
storing the new operating system fingerprint of the new target host in the storage location for a length of time.

4. The method of claim 1, further comprising:
monitoring a dynamic configuration protocol server;
detecting that a lease expire has occurred for an existing target host;
accessing the storage location; and
purging the existing operating system fingerprint for the existing target host from the storage location.

5. A computer-readable non-transitory storage medium embodying software this is operable when executed by a computer system to:
receive an alarm indicating a network intrusion may have occurred;
identify characteristics of the alarm, including at least an attack type, a source address, a target address, an alarm severity, and an alarm description;
access a storage location;
determine whether an operating system fingerprint for a target host associated with the target address already exists in the storage location;
if the operating system fingerprint for the target host does not exist, then:
  query the target host for the operating system fingerprint;
  receive the operating system fingerprint that includes the operating system type from the target host;
  compare the attack type to the operating system type; and
  indicate whether the target host is vulnerable to the attack based on the comparison;
if the operating system fingerprint for the target host does exist, then:
  determine if a cache entry time for the target address is valid; and
  if the cache entry time is invalid, then:
    query the target host for the operating system fingerprint;
    receive the operating system fingerprint that includes the operating system type from the target host;
    compare the attack type to the operating system type; and
    indicate whether the target host is vulnerable to the attack based on the comparison;
  if the cache entry time is valid, then:
    compare the attack type to the operating system type; and
    indicate whether the target host is vulnerable to the attack based on the comparison.

6. The medium of claim 5, wherein the software is further operable to store the operating system fingerprint of the target host in the storage location for a time period.

7. The medium of claim 5, wherein the software is further operable to:
monitor a dynamic configuration protocol server;
detect that a lease issue has occurred for a new target host;
query the new target host for a new operating system fingerprint;
receive the new operating system fingerprint from the new target host; and
store the new operating system fingerprint of the new target host in the storage location for a length of time.

8. The medium of claim 6, wherein the software is further operable to:
monitor a dynamic configuration protocol server;
detect that a lease expire has occurred for an existing target host;
access the storage location; and
purge the existing operating system fingerprint for the existing target host from the storage location.

9. An apparatus comprising:
a communication interface;
memory containing instructions for execution by a processor; and
the processor, operable when executing the instructions to:
  receive an alarm indicating a network intrusion may have occurred;
  identify characteristics of the alarm, including at least an attack type, a source address, a target address, an alarm severity, and an alarm description;
  access a storage location;
  determine whether an operating system fingerprint for a target host associated with the target address already exists in the storage location;
  if the operating system fingerprint for the target host does not exist, then:
    query the target host for the operating system fingerprint;
    receive the operating system fingerprint that includes the operating system type from the target host;
    compare the attack type to the operating system type; and
    indicate whether the target host is vulnerable to the attack based on the comparison;
  if the operating system fingerprint for the target host does exist, then:
    determine if a cache entry time for the target address is valid; and
    if the cache entry time is invalid, then:
      query the target host for the operating system fingerprint;
      receive the operating system fingerprint that includes the operating system type from the target host;
      compare the attack type to the operating system type; and
      indicate whether the target host is vulnerable to the attack based on the comparison;
    if the cache entry time is valid, then:
      compare the attack type to the operating system type; and
      indicate whether the target host is vulnerable to the attack based on the comparison.

10. The apparatus of claim 9, wherein the processor is further operable to store the operating system fingerprint of the target host in the storage location for a time period.

11. The apparatus of claim 9, wherein the processor is further operable to:
monitor a dynamic configuration protocol server;
detect that a lease issue has occurred for a new target host;

query the new target host for a new operating system fingerprint;
receive the new operating system fingerprint from the new target host; and
store the new operating system fingerprint of the new target host in the storage location for a length of time.

12. The apparatus of claim 9, wherein the processor is further operable to:

monitor a dynamic configuration protocol server;
detect that a lease expire has occurred for an existing target host;
access the storage location; and
purge the existing operating system fingerprint for the existing target host from the storage location.

\* \* \* \* \*

UNITED STATES PATENT AND TRADEMARK OFFICE
CERTIFICATE OF CORRECTION

| | | |
|---|---|---|
| PATENT NO. | : 7,886,357 B2 | Page 1 of 1 |
| APPLICATION NO. | : 10/402649 | |
| DATED | : February 8, 2011 | |
| INVENTOR(S) | : Craig H. Rowland et al. | |

It is certified that error appears in the above-identified patent and that said Letters Patent is hereby corrected as shown below:

Col. 7, Ln. 6: After "3. The method of claim" insert -- 1. --.

Signed and Sealed this
Tenth Day of May, 2011

David J. Kappos
*Director of the United States Patent and Trademark Office*